United States Patent
Mao et al.

(10) Patent No.: US 10,903,712 B2
(45) Date of Patent: Jan. 26, 2021

(54) MOTOR HAVING A HOUSING STRUCTURE TO ACCOMMODATE GROUNDING CONDUCTOR

(71) Applicant: NIDEC SERVO CORPORATION, Kiryu (JP)

(72) Inventors: Runxiang Mao, Kiryu (JP); Makoto Yajima, Kiryu (JP)

(73) Assignee: NIDEC SERVO CORPORATION, Gunma (JP)

( * ) Notice: Subject to any disclaimer, the term of this patent is extended or adjusted under 35 U.S.C. 154(b) by 0 days.

(21) Appl. No.: 16/278,752

(22) Filed: Feb. 19, 2019

(65) Prior Publication Data

US 2019/0305625 A1 Oct. 3, 2019

(30) Foreign Application Priority Data

Mar. 30, 2018 (JP) .................................. 2018-069755

(51) Int. Cl.
*H02K 3/50* (2006.01)
*H02K 7/20* (2006.01)
*H02K 1/27* (2006.01)

(52) U.S. Cl.
CPC ............. *H02K 3/50* (2013.01); *H02K 1/2793* (2013.01); *H02K 7/20* (2013.01); *H02K 2203/03* (2013.01)

(58) Field of Classification Search
CPC .......... H02K 1/2793; H02K 3/50; H02K 7/20; H02K 2203/03
USPC ...................................................... 310/71, 89
See application file for complete search history.

(56) References Cited

U.S. PATENT DOCUMENTS

| 5,087,497 A * | 2/1992 | Suzuki ................... H02K 23/66 156/196 |
| 7,922,467 B2 * | 4/2011 | Swanson ............. F04D 25/0606 417/423.7 |
| 2011/0120073 A1 * | 5/2011 | Flanary .................... H02K 5/08 56/250 |
| 2015/0102693 A1 * | 4/2015 | Pondelek ............... H02K 5/225 310/71 |
| 2015/0333596 A1 * | 11/2015 | Berkouk ................ H02K 11/33 310/71 |
| 2018/0048217 A1 * | 2/2018 | Hayashi ................. H02K 11/33 |

FOREIGN PATENT DOCUMENTS

| CN | 104956571 A | 9/2015 |
| JP | 2015-090726 A | 5/2015 |
| JP | 2017-229124 A | 12/2017 |

OTHER PUBLICATIONS

Official Communication issued in corresponding Chinese Patent Application No. 201910089471.7, dated Sep. 10, 2020.

* cited by examiner

*Primary Examiner* — Tulsidas C Patel
*Assistant Examiner* — Rashad H Johnson
(74) *Attorney, Agent, or Firm* — Keating & Bennett

(57) ABSTRACT

A motor includes a rotor including a shaft extending along a central axis, a stator radially facing the rotor, a circuit board electrically connected to a coil of the stator, and a motor case. The motor case includes a first case portion with a bottomed tubular shape to accommodate the rotor, the stator, and the circuit board, and a second case portion with a bottomed tubular shape that axially faces the first case portion and is connected to the first case portion. A grounding terminal to electrically connect an inner peripheral surface of the second case portion and a grounding electrode on the circuit board is provided.

5 Claims, 5 Drawing Sheets

MOTOR HAVING A HOUSING STRUCTURE TO ACCOMMODATE GROUNDING CONDUCTOR

CROSS REFERENCE TO RELATED APPLICATIONS

This application claims the benefit of priority to Japanese Patent Application No. 2018-069755 filed on Mar. 30, 2018. The entire contents of this application are hereby incorporated herein by reference.

BACKGROUND OF THE INVENTION

1. Field of the Invention

The present disclosure relates to a motor.

2. Description of the Related Art

Conventionally, as a direct current (DC) motor used for a consumer ventilator, a configuration in which a stator, a rotor, and a circuit board on which an electronic component constituting a drive circuit is mounted and which is connected to a coil of the stator are included in the inside of a metallic tubular frame and a metallic motor cover that blocks an opening of the tubular frame, has been described. Further, the potential of a through hole of the circuit board is set to the ground (GND) potential.

In the motor as described above, in order to set the potential of the through hole of the circuit board to the GND potential, one end of a grounding wire is connected to the through hole (ground terminal) of the circuit board. The grounding wire is drawn to the outside of the tubular frame and the motor cover. The other end of the grounding wire is connected to the tubular frame, the motor cover, or an external grounding unit.

However, when the grounding wire is drawn to the outside of the tubular frame and the motor cover, the grounding wire is drawn to the outside of the motor. Then, when current flows in the ground wire, noise may be radiated from the ground wire itself to the surroundings. Furthermore, when a power supply wire for supplying a current to the coil of the stator is connected to a power supply side connection terminal such as an outlet, the noise radiated from the grounding wire may propagate to other electronic devices via a power supply wire and a power supply connection terminal.

SUMMARY OF THE INVENTION

An example embodiment of the present disclosure includes a rotor including a shaft extending along a central axis, a stator radially facing the rotor, a circuit board electrically connected to a coil of the stator, and a motor case. The motor case includes a first case portion with a bottomed tubular shape for accommodating the rotor, the stator, and the circuit board, and a second case portion with a bottomed tubular shape that axially faces the first case portion and is connected to the first case portion. A grounding terminal to electrically connect an inner peripheral surface of the second case portion and the grounding electrode provided on the circuit board is provided.

The above and other elements, features, steps, characteristics and advantages of the present disclosure will become more apparent from the following detailed description of the example embodiments with reference to the attached drawings.

DETAILED DESCRIPTION OF THE PREFERRED EMBODIMENTS

Figure 1:
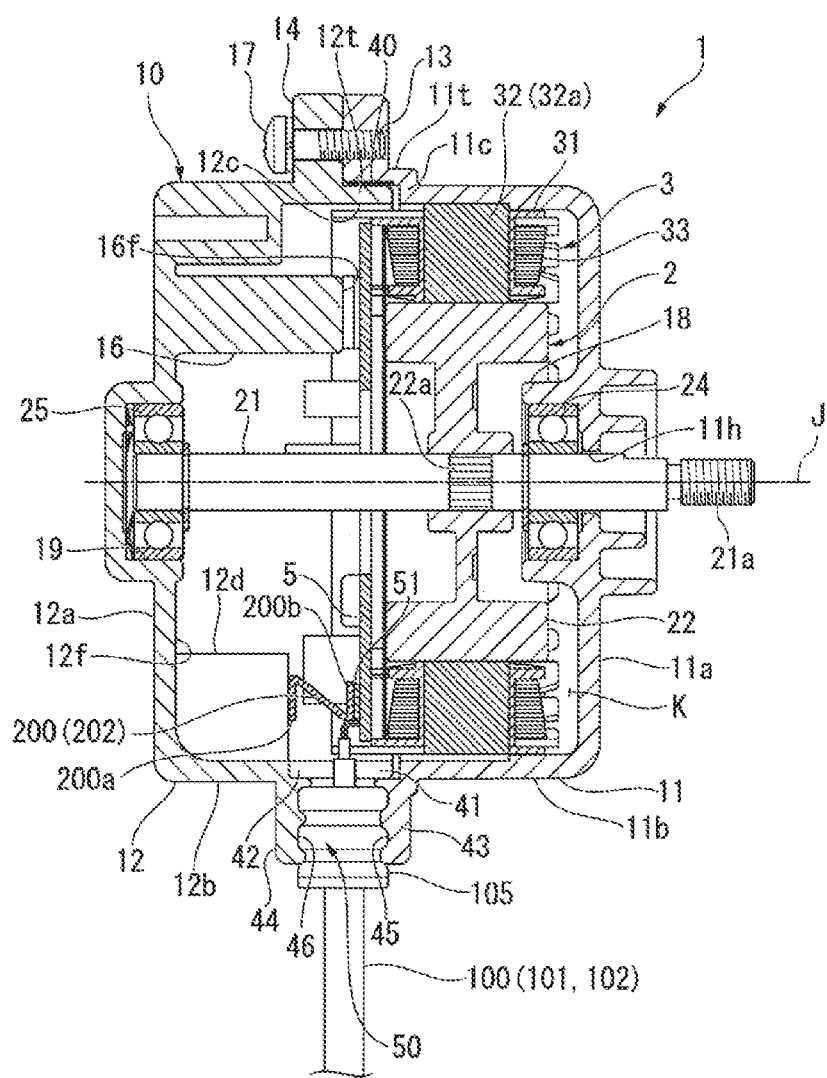
FIG. 1 is a sectional view showing a motor according to an example embodiment of the present disclosure.

FIG. 1 is a sectional view showing a motor according to an example embodiment of the present disclosure.

A motor 1 of the present embodiment shown in FIG. 1 is, for example, a motor for driving a fan of a ventilating fan. The motor 1 includes a rotor 2, a stator 3, a circuit board 5, and a motor case 10.

The rotor 2 includes a shaft 21 extending along a central axis J, a rotor core 22, and a permanent magnet (not shown). The shaft 21 extends in an axial direction along the central axis J. The shaft 21 is rotatably supported around the central axis J by bearings 24, 25 provided in the motor case 10. The rotor core 22 is provided radially outside the shaft 21. The rotor core 22 is fitted to a knurled portion 22*a* positioned in an axial middle portion along the central axis J in the shaft 21 and rotates together with the shaft 21 around the central axis J. The permanent magnet (not shown) is provided on an outer peripheral surface of the rotor core 22. A plurality of permanent magnets (not shown) are provided in a circumferential direction around the central axis J.

The stator 3 is located radially outward of the rotor 2 and faces the permanent magnet (not shown) of the rotor 2 in a radial direction. The stator 3 includes a stator core 31, a teeth portion 32, and a coil 33.

The stator core 31 is provided on an inner peripheral surface of the motor case 10. The stator core 31 is formed in a tubular shape as a whole by axially laminating a plurality of annular steel plates. The teeth portion 32 is provided radially inward of the stator core 31. The teeth portion 32 has a plurality of teeth 32*a* provided at equal intervals in a circumferential direction. Each of the teeth 32*a* extends radially inward. The coil 33 is wound around the teeth 32*a*.

The circuit board 5 supplies a current to the coil 33 of the stator 3. The circuit board 5 is in the form of a plate and is arranged in a plane orthogonal to the central axis J. The circuit board 5 is provided on one side (the left side in FIG. 1) in the axial direction along the central axis J with respect to the rotor 2 and the stator 3.

The motor case 10 accommodates the rotor 2, the stator 3, and the circuit board 5. The motor case 10 includes a first case portion 11 and a second case portion 12. Each of the first case portion 11 and the second case portion 12 is made by die casting in which a conductive metal material, such as an iron-based alloy or the like, is molded into a predetermined shape by casting.

Figure 2:
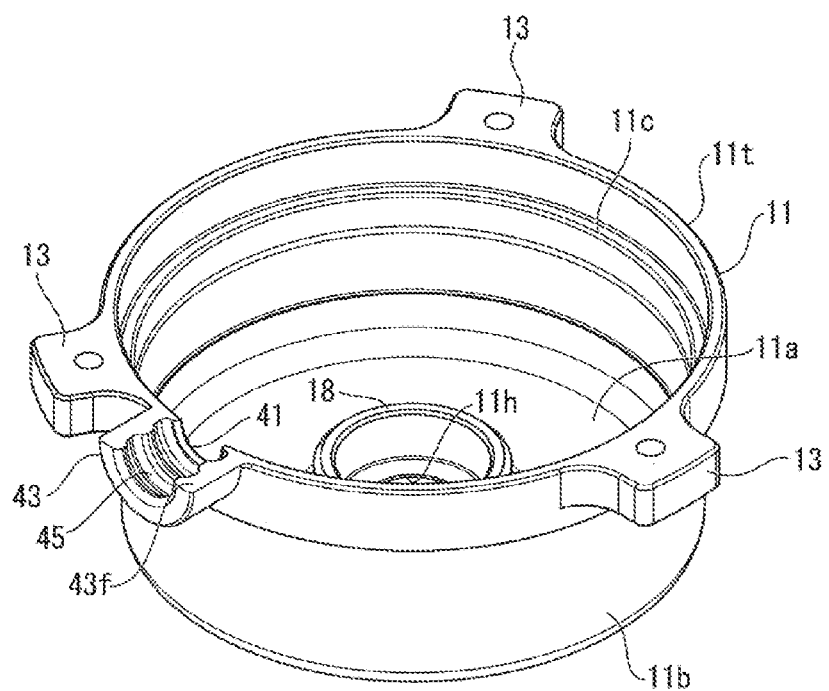
FIG. 2 is a perspective view showing a first case portion defining a motor case of a motor according to an example embodiment of the present disclosure.

FIG. 2 is a perspective view showing the first case portion constituting the motor case of the motor of the present embodiment.

The first case portion 11 is provided on the other side (the right side in FIG. 1) in the central axis J direction. As shown in FIGS. 1 and 2, the first case portion 11 has a bottomed tubular shape and includes a first bottom plate portion 11a, a first peripheral wall portion 11b, and a first flange portion 13.

The first bottom plate portion 11a is in the shape of a disk positioned in a plane orthogonal to the central axis J. In the center of the first bottom plate portion 11a, a bearing holding portion 18 for holding the bearing 24 is integrally provided. In the center of the first bottom plate portion 11a, a shaft through hole 11h is disposed. One end portion 21a of the shaft 21 projects outward from the motor case 10 in the direction of the central axis J through the shaft through hole 11h.

The first peripheral wall portion 11b has a cylindrical shape extending in an axial direction from an outer peripheral edge of the first bottom plate portion 11a. A first end portion 11c on the opposite side of the first bottom plate portion 11a in the first peripheral wall portion 11b opens toward the other side in the axial direction.

The first peripheral wall portion 11b has a first annular protruding portion 11t that protrudes in a direction opposite to the first bottom plate portion 11a along the axial direction. The first annular protruding portion 11t is cylindrical and has an inner diameter larger than an inner diameter of the first peripheral wall portion 11b.

The first flange portion 13 extends radially outward from the first annular protruding portion 11t provided at the first end portion 11c of the first peripheral wall portion 11b. The first flange portion 13 is provided at a plurality of positions spaced apart in the circumferential direction. In the present embodiment, the first flange portions 13 are provided at three positions with equal intervals in the circumferential direction.

Figure 3:
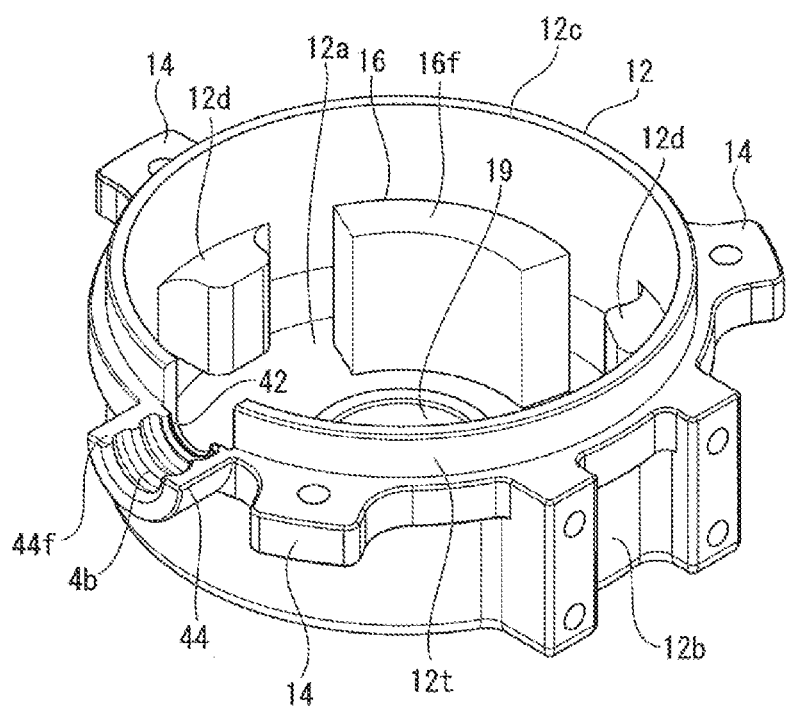
FIG. 3 is a perspective view showing a second case portion defining a motor case according to an example embodiment of the present disclosure.

FIG. 3 is a perspective view showing the second case portion constituting the motor case of the present embodiment.

As shown in FIG. 1, the second case portion 12 is provided on one side in the central axis J direction. As shown in FIGS. 1 and 3, the second case portion 12 has a bottomed tubular shape and includes a second bottom plate portion (bottom plate portion) 12a, a second peripheral wall portion (peripheral wall portion) 12b, a second flange portion 14.

The second bottom plate portion 12a is in the shape of a disk positioned in a plane orthogonal to the central axis J. In the center of the second bottom plate portion 12a, a bearing holding portion 19 for holding the bearing 25 is integrally provided.

The second peripheral wall portion 12b has a cylindrical shape extending in an axial direction from an outer peripheral edge of the second bottom plate portion 12a. A second end portion 12c on the opposite side of the second bottom plate portion 12a in the second peripheral wall portion 12b opens. The second peripheral wall portion 12b has a second annular protruding portion 12t that protrudes in a direction opposite to the second bottom plate portion 12a along the axial direction. The second annular protruding portion 12t is cylindrical and has an inner diameter equal to that of the second peripheral wall portion 12b. An outer diameter of the second annular protruding portion 12t is slightly smaller than the inner diameter of the first annular protruding portion 11t.

The second flange portion 14 extends radially outward from the second end portion 12c of the second peripheral wall portion 12b. The second flange portion 14 is provided at a plurality of positions spaced apart in the circumferential direction. In the present embodiment, the second flange portions 14 are provided at three positions at equal intervals in the circumferential direction.

A heat sink 16 is integrally provided on the second bottom plate portion 12a of the second case portion 12. The heat sink 16 protrudes in a direction away from the second bottom plate portion 12a along the axial direction. A front end surface 16f of the heat sink 16 is brought into contact with a heat generating electric element mounted on the circuit board 5 to radiate the heat of the electric element.

As shown in FIG. 1, the first case portion 11 and the second case portion 12 are connected in a state where the first end portion 11c of the first peripheral wall portion 11b and the second end portion 12c of the second peripheral wall portion 12b are caused to face each other in the axial direction. The first case portion 11 and the second case portion 12 are fixed by butting the first flange portion 13 and the second flange portion 14 against each other in the axial direction and fastening them with a screw 17. Further, the first annular protruding portion 11t and the second annular protruding portion 12t are fitted to each other between the first case portion 11 and the second case portion 12. The second annular protruding portion 12t of the second case portion 12 is inserted on an inner side of the first annular protruding portion 11t of the first case portion 11.

A sealing material 40 is provided between an inner peripheral surface of the first annular protruding portion 11t and an outer peripheral surface of the second annular protruding portion 12t. Prior to inserting the second annular protruding portion 12t on an inner side of the first annular protruding portion 11t, the sealing material 40 is preferably applied to at least either one of the outer peripheral surface of the second annular protruding portion 12t and the inner peripheral surface of the first annular protruding portion 11t.

The rotor 2, the stator 3, and the circuit board 5 are accommodated in space K formed by the first bottom plate portion 11a and the first peripheral wall portion 11b of the first case portion 11. The circuit board 5 is disposed radially inward of the first annular protruding portion 11t and the second annular protruding portion 12t in the first case portion 11.

A power supply wire 101 and a signal wire 102, and a grounding terminal member 200 are connected to the circuit board 5 in the motor case 10.

The power supply wire 101 supplies a current to the circuit board 5. The signal wire 102 inputs and outputs a control signal and the like between the circuit board 5 and an external controller (not shown). The power supply wire 101 and the signal wire 102 are bundled into one wire 100, one end of which is connected to the circuit board 5, and the other end of which is drawn to the outside of the motor case 10.

As shown in FIGS. 1 and 2, the first annular protruding portion 11t provided on the first peripheral wall portion 11b of the first case portion 11 has a notch portion 41 for radially drawing the wire 100 in part of the circumferential direction. Further, the first case portion 11 includes a first wire flange portion 43 extending radially outward from the first annular protruding portion 11t. The first wire flange portion 43 is provided at the same position as the first flange portion 13 in the axial direction. On a surface 43f of the first wire flange portion 43 facing the other side in the axial direction, a guide groove 45 extending continuously radially outward from the notch portion 41 is disposed.

As shown in FIGS. 1 and 3, a notch portion 42 for radially drawing the wire 100 is disposed in part of the second peripheral wall portion 12b of the second case portion 12 in the circumferential direction. Further, the second case portion 12 includes a second wire flange portion 44 extending radially outward from the second peripheral wall portion 12b. The second wire flange portion 44 is provided at the same position as the second flange portion 14 in the axial direction. On the second wire flange portion 44, a guide groove 46 extending continuously radially outward from the notch portion 42 is disposed on a surface 44f facing the other side in the axial direction.

As shown in FIG. 1, in a state in which the first flange portion 13 of the first case portion 11 and the second flange portion 14 of the second case portion 12 are axially butted against each other, the first wire flange portion 43 and the second wire flange portion 44 are axially butted against each other. The surface 43f of the first wire flange portion 43 and the surface 44f of the second wire flange portion 44 are brought into close contact with each other. A sealing material may be provided between the surface 43f of the first wire flange portion 43 and the surface 44f of the second wire flange portion 44.

As shown in FIG. 1, in a state where the first wire flange portion 43 and the second wire flange portion 44 are butted against each other, the notch portion 41 and the notch portion 42, the guide groove 45 and the guide groove 46 axially face each other to form a wire through hole 50. The wire 100 is drawn from the inside of the motor case 10 to the outside through the wire through hole 50. A tubular grommet 105 is mounted on the wire 100 passing through the wire through hole 50. The grommet 105 is made of a rubber-based material or the like, and seals between the wire 100 and the guide grooves 45, 46.

The grounding terminal member 200 electrically connects an inner peripheral surface 12f of the second case portion 12 and a grounding electrode 51 provided on the circuit board 5. In the grounding terminal member 200, a proximal end portion 200a is fixed to the second case portion 12, and a front end portion 200b is connected to the grounding electrode 51 provided on the circuit board 5. The grounding terminal member 200 is provided, for example, on a base portion 12d provided on the second case portion 12 by a bonding material (for example, solder) (not shown). The base portion 12d protrudes toward an inner side of the motor case 10 from the second bottom plate portion 12a and the second peripheral wall portion 12b of the second case portion 12. The base portion 12d and the second case portion 12 constitute a single member. The base portion 12d is provided, for example, to dispose a female screw hole (not shown) on an outer peripheral surface side of the second case portion 12.

The grounding terminal member 200 includes an elastic portion 202. The elastic portion 202 is molded, for example, by bending a metal plate into a Z shape. The elastic portion 202 is elastically deformable in a direction in which the first case portion 11 and the second case portion 12 face each other, that is, in the axial direction. In a state where the first flange portion 13 of the first case portion 11 and the second flange portion 14 of the second case portion 12 are butted against each other in the axial direction, the elastic portion 202 is butted against and electrically connected to the grounding electrode 51 of the circuit board 5. In this state, the elastic portion 202 is in an axially compressed state and is reliably butted against the grounding electrode 51.

In this manner, the grounding terminal member 200 electrically connects the inner peripheral surface 12f of the second case portion 12 and the grounding electrode 51 provided on the circuit board 5. With the first case portion 11 and the second case portion 12 connected to each other, the grounding terminal member 200 electrically connects the inner peripheral surface 12f of the second case portion 12 and the grounding electrode 51 provided on the circuit board 5. In a state in which the first case portion 11 and the second case portion 12 are axially separated and the first case portion 11 and the second case portion 12 are disconnected from each other, the terminal member 200 provided on the second case portion 12 is spaced apart from the grounding electrode 51 of the circuit board 5. As a result, the grounding terminal member 200 is in a non-contact state with the grounding electrode 51 of the circuit board 5.

According to the present embodiment, the grounding terminal member 200 for electrically connecting the inner peripheral surface 12f of the second case portion 12 and the grounding electrode 51 provided on the circuit board 5 is provided. According to such a configuration, the grounding electrode 51 provided on the circuit board 5 and the second case portion 12 are electrically connected by the grounding terminal member 200. As a result, the circuit board 5 can be grounded to the motor case 10 without exposing the grounding terminal member 200 to the outside of the motor case 10. Further, since the grounding terminal member 200 can have a minimum length for connecting the circuit board 5 and the second case portion 12, generation of noise can be suppressed by reducing the length of the grounding terminal member 200. In this manner, it is possible to suppress noise generated when the motor 1 is operated. Therefore, even when the power supply wire 101 is connected to the power supply side connection terminal such as an outlet, it is possible to prevent the noise radiated from the grounding terminal member 200 from propagating to other electronic devices via the power supply wire 101.

According to the present embodiment, with the first case portion 11 and the second case portion 12 connected to each other, the grounding terminal member 200 electrically connects the inner peripheral surface 12f of the second case portion 12 and the grounding electrode 51 provided on the circuit board 5. In a state in which the first case portion 11 and the second case portion 12 are disconnected from each other, the grounding terminal member 200 provided on the second case portion 12 is spaced apart from the grounding electrode 51 of the circuit board 5. As a result, the grounding terminal member 200 is in a non-contact state with the grounding electrode 51 of the circuit board 5. Therefore, if the first case portion 11 and the second case portion 12 are caused to face each other and coupled, the circuit board 5 can be grounded to the motor case 10, and the assembling property of the motor case 10 is improved.

According to the present embodiment, the grounding terminal member 200 includes the elastic portion 202. According to such a configuration, when the first case portion 11 and the second case portion 12 are caused to face each other and combined, the elastic portion 202 is pressed in a direction in which the first case portion 11 and the second case portion 12 face each other. This makes it possible to reliably electrically connect the elastic portion 202 to the grounding electrode 51.

According to the present embodiment, in the grounding terminal member 200, the proximal end portion 200a is fixed to the second case portion 12, and the front end portion 200b is connected to the grounding electrode 51 provided on the circuit board 5. According to such a configuration, by combining the first case portion 11 and the second case portion 12, the front end portion 200b of the grounding terminal member 200 comes into contact with the grounding electrode 51 of the circuit board 5 and is electrically connected. In this manner, the trouble of attaching the grounding terminal member 200 is reduced, and the assembly property is improved.

According to the present embodiment, the second case portion 12 includes the base portion 12d projecting from the second bottom plate portion 12a and the second peripheral wall portion 12b. The grounding terminal member 200 is fixed to the base portion 12d. In this manner, the axial length of the grounding terminal member 200 can be further reduced.

In the above embodiment, the first case portion 11 and the second case portion 12 of the motor case 10 are made by die casting, but the present invention is not limited to the above.

Figure 4:
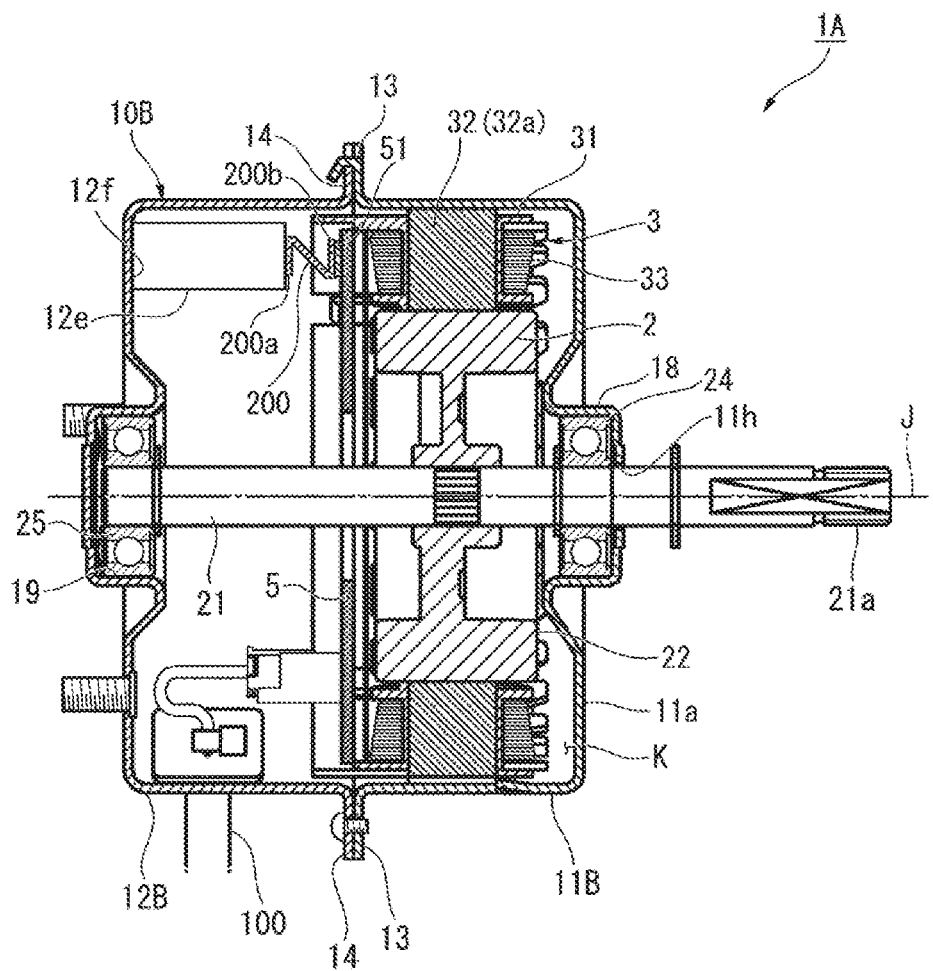
FIG. 4 is a sectional view showing a motor according to a variation of an example embodiment of the present disclosure.

For example, like a motor 1A shown in FIG. 4, a first case portion 11B and a second case portion 12B of a motor case 10B may each be molded by applying press working or the like to a metal plate having conductivity. In this case, the grounding terminal member 200 electrically connects a base portion 12e provided on the inner peripheral surface 12f of the second case portion 12B and the grounding electrode 51 provided on the circuit board 5. The base portion 12e is fixed to the inner peripheral surface 12f of the second case portion 12B by screw fastening, welding, or the like.

While an embodiment of the present disclosure and a variation are described above, it will be understood that features, a combination of the features, and so on according to the embodiment and the variation are one example, and that an addition, elimination, and substitution of a feature(s), and other modifications can be made without departing from the scope and spirit of the present disclosure. Further, the present disclosure is not limited by the embodiment.

For example, the application of the motor 1 described in the above embodiment and variation is not particularly limited.

Further, in the above-described embodiment, the base portion 12d projects from the second bottom plate portion 12a and the second peripheral wall portion 12b. However, the configuration is not limited to the above. For example, the base portion 12d may project radially inward from the second peripheral wall portion 12b. Further, the base portion 12d may project from the second bottom plate portion 12a toward the circuit board 5 side along the axial direction.

Figure 5:
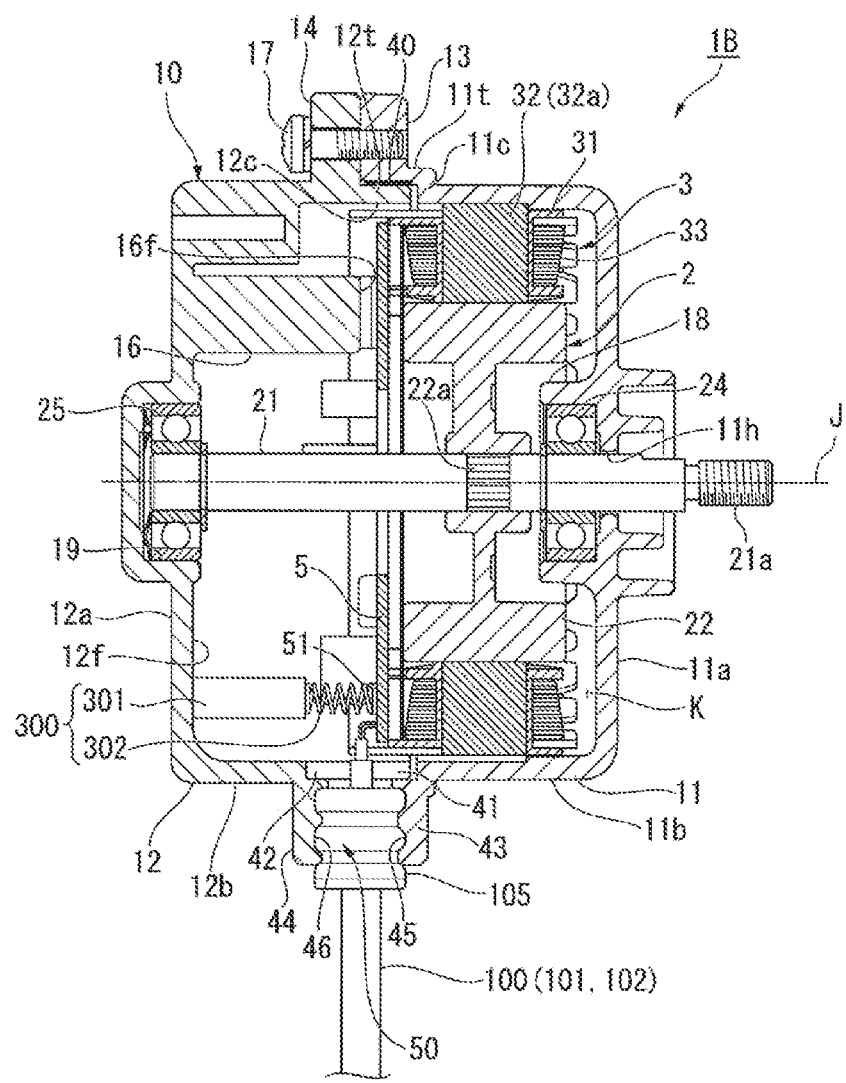
FIG. 5 is a sectional view showing a motor according to another variation of an example embodiment of the present disclosure.

Further, in the above embodiment, the grounding terminal member 200 is provided on the base portions 12d and 12e of the second case portions 12 and 12B. However, the present invention is not limited to this configuration. The grounding terminal member 200 may be directly fixed to the second case portions 12 and 12B. In this case, for example, like a motor 1B shown in FIG. 5, a grounding terminal member 300 includes a terminal member main body 301 fixed to the inner peripheral surface 12f of the second case portion 12, and an elastic portion 302 provided on a front end portion of the terminal member main body 301. The elastic portion 302 is not limited to a leaf spring material, and may have a coil spring shape, or the like.

Further, in the above-described embodiment, the proximal end portion of the grounding terminal member 200 may be fixed to the grounding electrode 51 of the circuit board 5, and the front end portion may be brought into contact with the second case portion 12. That is, the grounding terminal member 200 may be provided on the circuit board 5 side. In this case, the elastic portion 202 is provided so as to be butted against the inner peripheral surface 12f of the second case portion 12.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor comprising:
   a rotor including a shaft extending along a central axis;
   a stator radially opposing the rotor;
   a circuit board electrically connected to a coil of the stator;
   a motor case including a first case portion with a bottomed tubular shape to accommodate the rotor, the stator, and the circuit board, and a second case portion with a bottomed tubular shape that axially opposes the first case portion and is connected to the first case portion; and
   a grounding terminal to electrically connect an inner peripheral surface of the second case portion and a grounding electrode provided on the circuit board; wherein
   the grounding terminal includes an elastic portion that is elastically deformable in a direction in which the first case portion and the second case portion oppose each other; and
   a compressing force is exerted on the elastic portion by the first case portion and the second case portion when the first case portion and the second case portion are coupled.

2. The motor according to claim 1, wherein the grounding terminal:
   electrically connects an inner peripheral surface of the first case portion or the second case portion to a grounding electrode provided on the circuit board when the first case portion and the second case portion are coupled; and
   is spaced apart from one of the inner peripheral surface of the first case portion or the second case portion and the grounding electrode provided on the circuit board when the first case portion and the second case portion are disconnected from each other.

3. The motor according to claim 1, wherein the grounding terminal includes a proximal end portion fixed to the second case portion and a front end portion connected to the grounding electrode provided on the circuit board.

4. The motor according to claim 3, wherein
   the first case portion or the second case portion includes a bottom plate portion that intersects a direction in which the first case portion and the second case portion oppose each other, a tubular peripheral wall portion axially extending from an outer peripheral edge of the bottom plate portion, and a base portion projecting from at least one of the bottom plate portion and the peripheral wall portion; and
   the grounding terminal is directly physically fixed to the base portion.

5. The motor according to claim 1, wherein the grounding terminal is defined by a metal plate bent into a Z shape.

* * * * *